US009356506B1

United States Patent
Ho

(10) Patent No.: US 9,356,506 B1
(45) Date of Patent: May 31, 2016

(54) CHARGE PUMP REGULATOR AND CONTROL METHOD THEREOF

(71) Applicant: eMemory Technology Inc., Hsin-Chu (TW)

(72) Inventor: Hsin-Liang Ho, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 0 days.

(21) Appl. No.: 14/789,311

(22) Filed: Jul. 1, 2015

Related U.S. Application Data

(60) Provisional application No. 62/141,282, filed on Apr. 1, 2015.

(51) Int. Cl.
*H02M 3/07* (2006.01)
*H02M 1/00* (2006.01)

(52) U.S. Cl.
CPC ........ *H02M 3/07* (2013.01); *H02M 2001/0032* (2013.01); *H02M 2001/0041* (2013.01); *H02M 2003/075* (2013.01)

(58) Field of Classification Search
CPC ... H02M 3/06; H02M 3/07; H02M 2003/077; H02M 2003/075; H02M 2001/0041; H02M 2001/0032; H03F 3/07

USPC .......................................... 327/534–540, 589
See application file for complete search history.

(56) References Cited

U.S. PATENT DOCUMENTS

| 5,216,588 | A | 6/1993 | Bajwa et al. | |
|---|---|---|---|---|
| 6,300,839 | B1 | 10/2001 | Bazargan et al. | |
| 6,765,428 | B2 * | 7/2004 | Kim ...................... | H02M 3/073 327/534 |
| 7,173,478 | B2 * | 2/2007 | Chun ...................... | H02M 3/07 327/536 |
| 2008/0191786 | A1 | 8/2008 | Kwon et al. | |
| 2012/0242401 | A1 | 9/2012 | Siragusa et al. | |

* cited by examiner

*Primary Examiner* — Dinh T Le
(74) *Attorney, Agent, or Firm* — WPAT, P.C.; Justin King

(57) ABSTRACT

A charge pump regulator at least includes a first charge pump circuit and a second charge pump circuit. In an enabled period, a first clock signal is provided to the first charge pump circuit. Consequently, the first charge pump circuit generates an output voltage to an output terminal of the charge pump regulator. In the enabled period, a second clock signal is provided to the second charge pump circuit. Consequently, the second charge pump circuit generates the output voltage to the output terminal of the charge pump regulator. In a first time interval of the enabled period, the first clock signal has a first frequency and the second clock signal is maintained at a fixed level. In a second time interval of the enabled period, both of the first clock signal and the second clock signal have a second frequency.

16 Claims, 10 Drawing Sheets

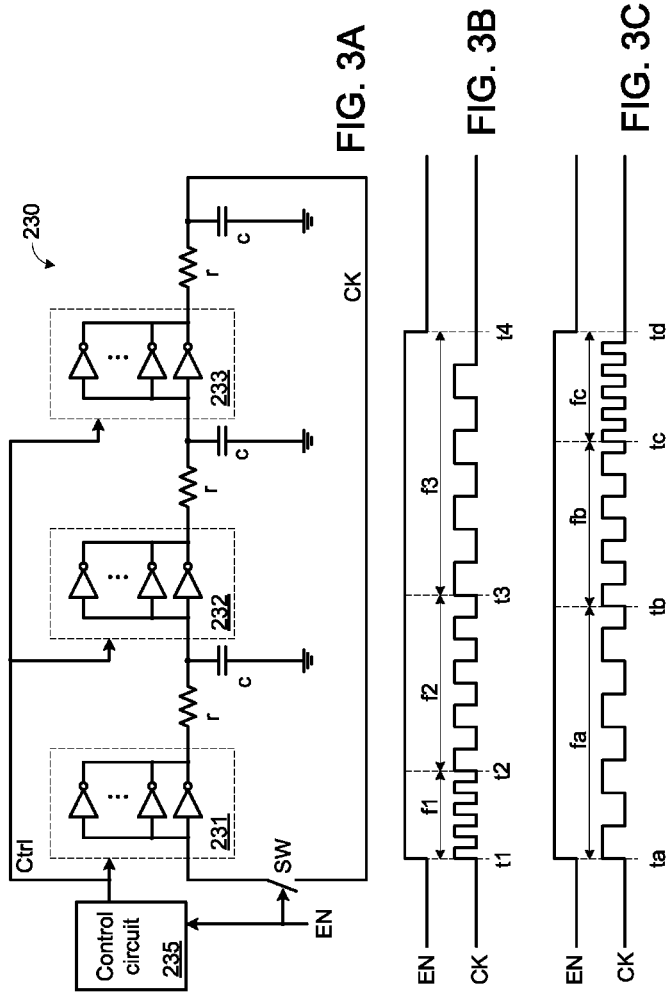

CHARGE PUMP REGULATOR AND CONTROL METHOD THEREOF

This application claims the benefit of U.S. provisional patent application No. 62/141,282, filed Apr. 1, 2015, the subject matter of which is incorporated herein by reference.

FIELD OF THE INVENTION

The present invention relates to a voltage regulator, and more particularly to a charge pump regulator and a control method thereof.

BACKGROUND OF THE INVENTION

FIG. 1 is a schematic circuit diagram illustrating a conventional charge pump regulator. As shown in FIG. 1, the charge pump regulator 100 comprises a charge pump circuit 110, a feedback detector 120 and a clock generator 130. An output signal Vout is generated by the charge pump regulator 100 and transmitted to a bulk capacitor Cb.

The charge pump circuit 110 receives a source clock CK and generates the output signal Vout. When the source clock CK is maintained at a fixed level, the magnitude of the output signal Vout gradually decreases. Whereas, when the source clock CK is switched between a high level state and a low level state, the magnitude of the output signal Vout gradually increases according to a signal edge (e.g. a rising edge or a falling edge) of the source clock CK.

Moreover, the feedback detector 120 comprises a voltage divider 122 and a comparator 124. The voltage divider 122 consists of two resistors R1 and R2. The voltage divider 122 receives the output signal Vout and generates a feedback signal Vfb. A negative input terminal of the comparator 124 receives the feedback signal Vfb. A positive input terminal of the comparator 124 receives a reference voltage Vref. An output terminal of the comparator 124 generates an enabling signal EN. In the voltage divider 122, the relationship between the output signal Vout and the feedback signal Vfb is expressed as: $Vfb=(R2 \times Vout)/(R1+R2)$. As the magnitude of the output signal Vout increases, the magnitude of the feedback signal Vfb increases. On the other hand, as the magnitude of the output signal Vout decreases, the magnitude of the feedback signal Vfb decreases.

Moreover, after the clock generator 130 receives the enabling signal EN, the clock generator 130 generates the source clock CK according to the enabling signal EN. Moreover, if the magnitude of the feedback signal Vfb is higher than the magnitude of the reference voltage Vref, the enabling signal EN is in the low level state to disable the clock generator 130 and the source clock CK is maintained at the fixed level. Consequently, the magnitude of the output signal Vout gradually decreases. If the magnitude of the feedback signal Vfb is lower than the magnitude of the reference voltage Vref, the enabling signal EN is in the high level state to enable the clock generator 130. Consequently, the source clock CK is switched between the high level state and the low level state, and the magnitude of the output signal Vout gradually increases according to the signal edge of the source clock CK.

When the charge pump regulator 100 reaches the steady state, the output signal Vout is maintained at a level near a target voltage. The target voltage is equal to $Vref \times (1+R1/R2)$. However, the output signal Vout contains ripple.

SUMMARY OF THE INVENTION

The present invention provides a charge pump regulator and a control method thereof. The charge pump regulator includes plural charge pump circuits. The plural charge pump circuits are enabled according to the filtered clocks received at different time points. Consequently, the ripple of the output signal can be effectively reduced.

An embodiment of the present invention provides a charge pump regulator. The charge pump regulator includes a charge pump module, a feedback detector and a clock generator. The charge pump module has a clock input terminal receiving a source clock and an output terminal generating an output signal. The feedback detector is connected with the output terminal of the charge pump module. The feedback detector receives the output signal and generates an enabling signal. The clock generator receives the enabling signal and generates the source clock. According to the enabling signal, the source clock is maintained at a fixed level or the source clock switched between a high level state and a low level state. The charge pump module includes at least a first filter, a first charge pump circuit, a second filter and a second charge pump circuit. The first filter receives the source clock from the clock input terminal and generates a first filtered clock. The first charge pump circuit receives the first filtered clock and generates the output signal to the output terminal of the charge pump module. The second filter receives the source clock from the clock input terminal and generates a second filtered clock. The second charge pump circuit receives the second filtered clock and generates the output signal to the output terminal of the charge pump module. If the source clock from the clock generator is switched between the high level state and the low level state, the source clock has a first frequency in a first time interval and the source clock has a second frequency in a second time interval. The first frequency and the second frequency are different.

Another embodiment of the present invention provides a charge pump regulator. The charge pump regulator includes a charge pump module, a feedback detector and a clock generator. At least two clock input terminals of the charge pump module receive a first source clock and a second source clock, respectively. An output terminal of the charge pump module generates an output signal. The charge pump module at least includes a first charge pump circuit and a second charge pump circuit. The first charge pump circuit receives the first source clock and generates the output signal to the output terminal of the charge pump module. The second pump circuit receives the second source clock and generates the output signal to the output terminal of the charge pump module. The feedback detector is connected with the output terminal of the charge pump module. The feedback detector receives the output signal and generates an enabling signal. The clock generator receives the enabling signal and generates the first source clock and the second source clock in an enabled period. In a first time interval of the enabled period, the first source clock from the clock generator has a first frequency and the second source clock from the clock generator is maintained at a fixed level. In a second time interval of the enabled period, the first source clock from the clock generator has the first frequency and the second source clock from the clock generator has a second frequency, wherein the first frequency and the second frequency are different.

A further embodiment of the present invention provides a control method for a charge pump regulator. The charge pump regulator at least includes a first charge pump circuit and a second charge pump circuit. The control method includes the following steps. In an enabled period, a first clock signal is provided to the first charge pump circuit. Consequently, the first charge pump circuit generates an output voltage to an output terminal of the charge pump regulator. In the enabled period, a second clock signal is provided to the second charge pump circuit. Consequently, the second charge pump circuit generates the output voltage to the output terminal of the charge pump regulator. The first clock signal has a first frequency and the second clock signal is maintained at a fixed level in a first time interval of the enabled period, and both of the first clock signal and the second clock signal have a second frequency different from first frequency in a second time interval of the enabled period. Alternatively, the first clock signal has the first frequency and the second clock signal is maintained at the fixed level in the first time interval of the enabled period, and the first clock signal has the first frequency and the second clock signal has the second frequency in the second time interval of the enabled period.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 3A is a schematic circuit diagram illustrating the clock generator of the charge pump regulator according to the first embodiment of the present invention;

FIGS. 3B and 3C are schematic timing waveform diagrams illustrating the source clock of the clock generator of FIG. 3A;

DETAILED DESCRIPTION OF PREFERRED EMBODIMENTS

Figure 1:
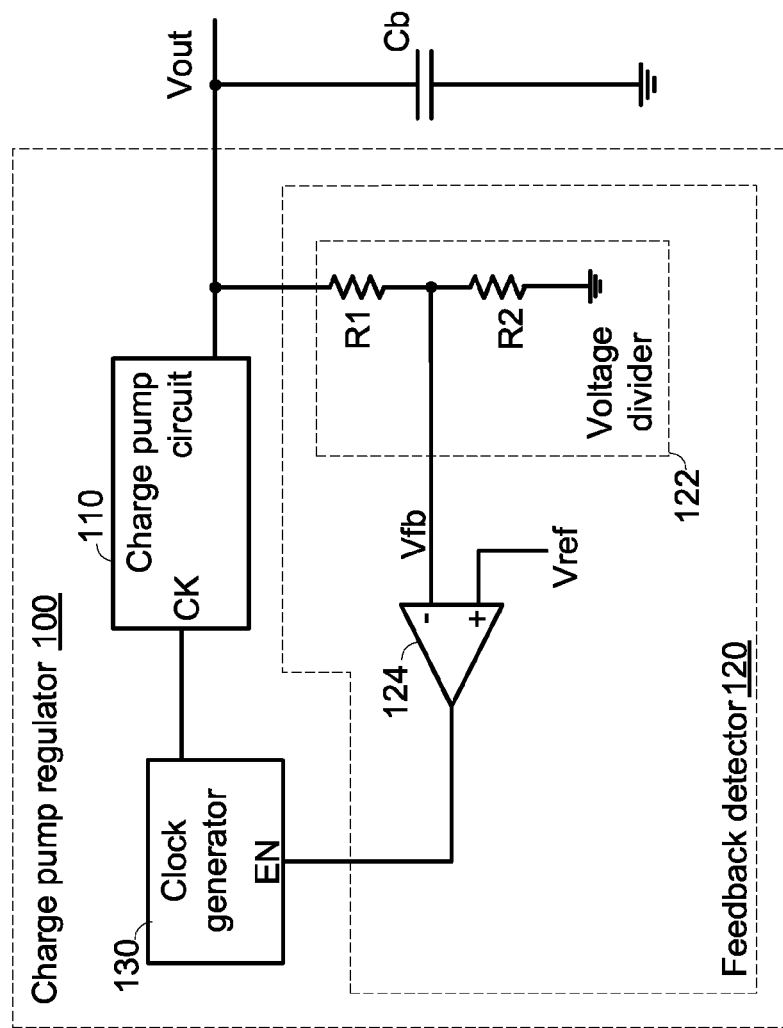
FIG. 1 (prior art) is a schematic circuit diagram illustrating a conventional charge pump regulator.
Figure 2:
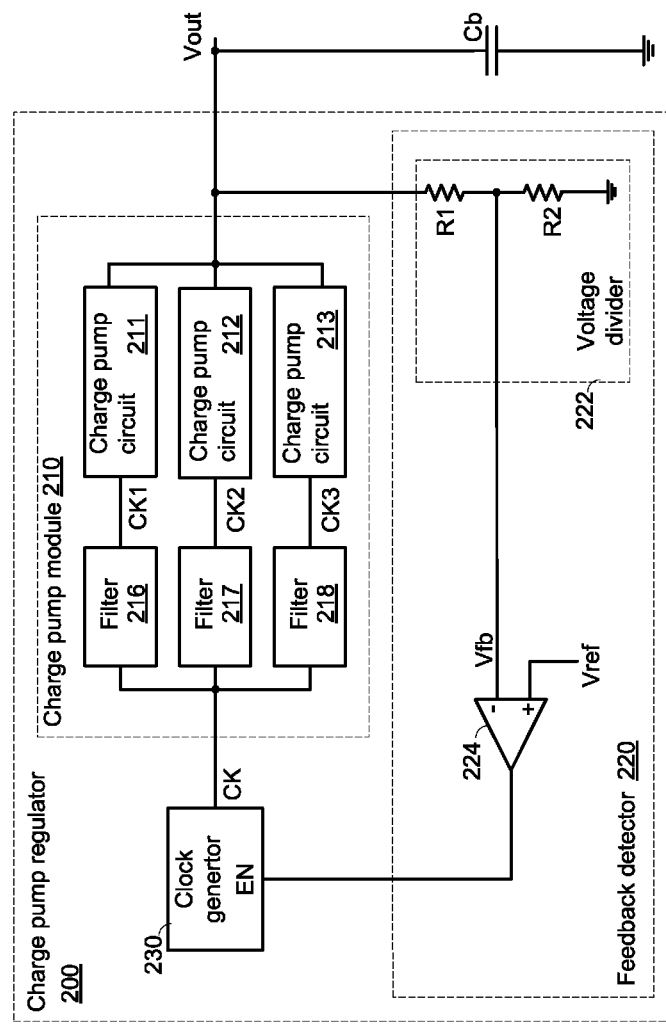
FIG. 2 is a schematic circuit block diagram illustrating a charge pump regulator according to a first embodiment of the present invention.

FIG. 2 is a schematic circuit block diagram illustrating a charge pump regulator according to a first embodiment of the present invention. As shown in FIG. 2, the charge pump regulator 200 comprises a charge pump module 210, a feedback detector 220 and a clock generator 230. An output signal Vout is generated by the charge pump regulator 200 and transmitted to a bulk capacitor Cb.

The charge pump module 210 receives a source clock CK and generates the output signal Vout. When the source clock CK is maintained at a fixed level, the magnitude of the output signal Vout gradually decreases. Whereas, when the source clock CK is switched between a high level state and a low level state, the magnitude of the output signal Vout gradually increases according to a signal edge (e.g. a rising edge or a falling edge) of the source clock CK.

Moreover, the feedback detector 220 comprises a voltage divider 222 and a comparator 224. The voltage divider 222 consists of two resistors R1 and R2. The voltage divider 222 receives the output signal Vout and generates a feedback signal Vfb. A negative input terminal of the comparator 224 receives the feedback signal Vfb. A positive input terminal of the comparator 224 receives a reference voltage Vref. An output terminal of the comparator 224 generates an enabling signal EN. In the voltage divider 222, the relationship between the output signal Vout and the feedback signal Vfb is expressed as: Vfb=(R2×Vout)/(R1+R2). As the magnitude of the output signal Vout increases, the magnitude of the feedback signal Vfb increases. On the other hand, as the magnitude of the output signal Vout decreases, the magnitude of the feedback signal Vfb decreases.

Moreover, after the clock generator 230 receives the enabling signal EN, the clock generator 230 generates the source clock CK according to the enabling signal EN. Moreover, if the magnitude of the feedback signal Vfb is higher than the magnitude of the reference voltage Vref, the enabling signal EN is in the low level state to disable the clock generator 230 and the source clock CK is maintained at the fixed level. Consequently, the magnitude of the output signal Vout gradually decreases. If the magnitude of the feedback signal Vfb is lower than the magnitude of the reference voltage Vref, the enabling signal EN is in the high level state to enable the clock generator 230. Consequently, the source clock CK is switched between the high level state and the low level state, and the magnitude of the output signal Vout gradually increases according to the signal edge of the source clock CK.

When the charge pump regulator 200 reaches the steady state, the output signal Vout is maintained at a level near a target voltage Vtarget. The target voltage is equal to Vref×(1+R1/R2). However, the output signal Vout contains ripple.

In this embodiment, the frequency of the source clock CK from the clock generator 230 varies with time. Hereinafter, the operations of the clock generator 230 will be illustrated with reference to FIGS. 3A, 3B and 3C. FIG. 3A is a schematic circuit diagram illustrating the clock generator of the charge pump regulator according to the first embodiment of the present invention. FIGS. 3B and 3C are schematic timing waveform diagrams illustrating the source clock of the clock generator of FIG. 3A.

In this embodiment, the clock generator 230 is a ring oscillator. The clock generator 230 comprises plural inverter circuits 231, 232 and 233. Each of the inverter circuits 231, 232 and 233 comprises plural NOT gates, which are connected with each other in parallel. The number of the enabled NOT gates of each of the inverter circuits 231, 232 and 233 are determined according to a control signal Ctrl. Generally, the greater number of the enabled NOT gates indicates the stronger driving strength of the inverter circuit 231, 232 or 233 and the higher frequency of the source clock CK. Whereas, the less number of the enabled NOT gates indicates the weaker driving strength of the inverter circuit 231, 232 or 233 and the lower frequency of the source clock CK.

In a disabled period, the enabling signal EN received by the clock generator 230 is in the low level state. Meanwhile, a switching element SW is an open state, and the ring oscillator cannot be formed as a loop. Under this circumstance, the source clock CK is maintained at a fixed level.

In an enabled period, the enabling signal EN received by the clock generator 230 is in the high level state. Meanwhile, the switching element SW is in a close state, and the ring oscillator is formed as a loop. Under this circumstance, the source clock CK is switched between the high level state and the low level state.

Moreover, in case that the enabling signal EN received by a control circuit 235 is in the low level state, the control circuit 235 is disabled. Whereas, in case that the enabling signal EN received by the control circuit 235 is in the high level state, the control circuit 235 is enabled. Consequently, the numbers of the enabled NOT gates of the inverter circuits 231, 232 and 233 are changed according to the control signal Ctrl. In accordance with the present invention, the control circuit 235 is programmed to change the numbers of the enabled NOT gates of the inverter circuits 231, 232 and 233 at specified time points according to the control signal Ctrl.

Please refer to FIG. 3B. In the time interval between the time point t1 and the time point t2, the greatest number of NOT gates are enabled according to the control signal Ctrl. Consequently, the source clock CK has the highest frequency f1 in the time interval between the time point t1 and the time point t2. In the time interval between the time point t2 and the time point t3, less number of NOT gates are enabled according to the control signal Ctrl. Consequently, the source clock CK has the lower frequency f2 in the time interval between the time point t2 and the time point t3. In the time interval between the time point t3 and the time point t4, the least number of NOT gates are enabled according to the control signal Ctrl. Consequently, the source clock CK has the lowest frequency f3 in the time interval between the time point t3 and the time point t4. In other words, the enabled NOT gates of the inverter circuits 231, 232 and 233 are gradually decreased by the control circuit 235 at the set time points. Consequently, the frequency of the source clock CK gradually decreases.

Please refer to FIG. 3C. In the time interval between the time point ta and the time point tb, the less number of NOT gates are enabled according to the control signal Ctrl. Consequently, the source clock CK has the lower frequency fa in the time interval between the time point ta and the time point tb. In the time interval between the time point tb and the time point tc, the greater number of NOT gates are enabled according to the control signal Ctrl. Consequently, the source clock CK has the higher frequency fb in the time interval between the time point tb and the time point tc. In the time interval between the time point tc and the time point td, the greatest number of NOT gates are enabled according to the control signal Ctrl. Consequently, the source clock CK has the highest frequency fc in the time interval between the time point tc and the time point td. In other words, the enabled NOT gates of the inverter circuits 231, 232 and 233 are gradually increased by the control circuit 235 at the set time points. Consequently, the frequency of the source clock CK gradually increases.

It is noted that the example of the clock generator 230 is not limited to the ring oscillator. The clock generator with the similar function can be used as the clock generator 230 of the present invention. Moreover, the control circuit 235 may be programmed to change the resistance values of the resistors r or the capacitance values of the capacitors c, so that the frequency of the source clock CK is correspondingly changed.

Figure 4A:
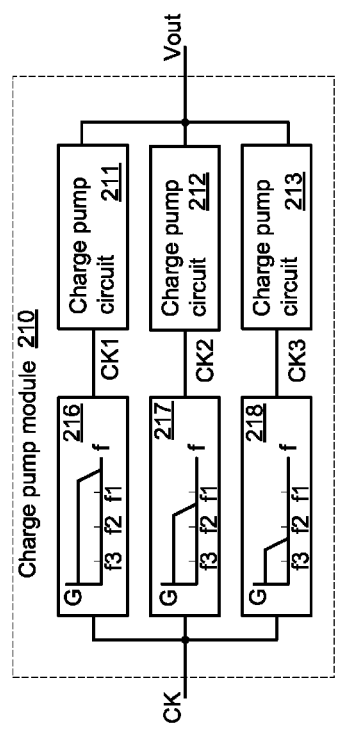
FIG. 4A is a schematic circuit diagram illustrating an exemplary charge pump module of the charge pump regulator according to the first embodiment of the present invention.
Figure 4B:
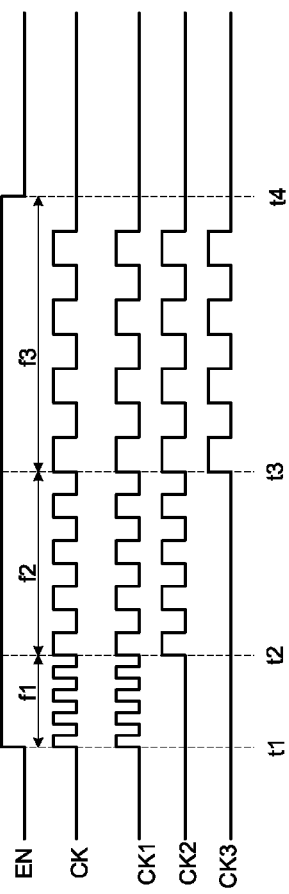
FIGS. 4B and 4C are schematic timing waveform diagrams illustrating associated signals of the charge pump module of FIG. 4A.
Figure 4C:
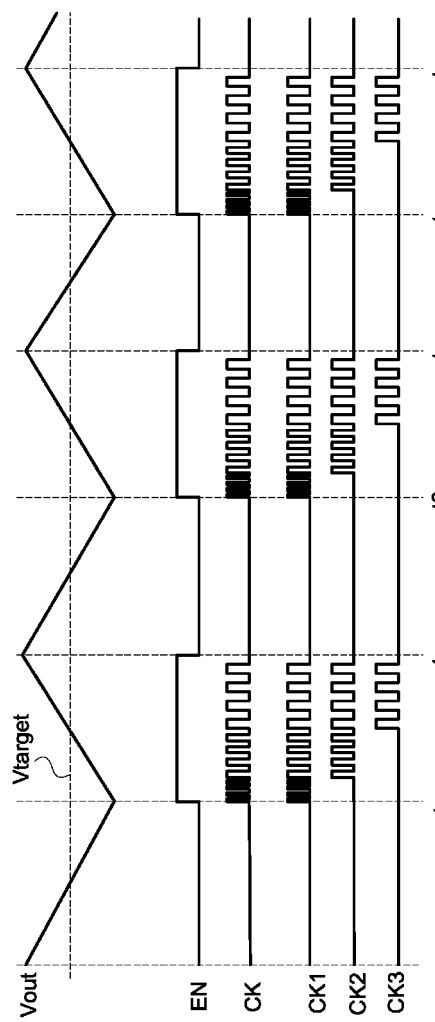

FIG. 4A is a schematic circuit diagram illustrating an exemplary charge pump module of the charge pump regulator according to the first embodiment of the present invention. FIGS. 4B and 4C are schematic timing waveform diagrams illustrating associated signals of the charge pump module of FIG. 4A. The charge pump module 210 comprises plural filters and plural charge pump circuits. In this embodiment, the source clock generated by the clock generator 230 has three variable frequencies, and the charge pump module 210 comprises three filters 216, 217, 218 and three charge pump circuits 211, 212, 213. It is noted that numerous modifications and alterations may be made while retaining the teachings of the invention. For example, the source clock generated by the clock generator 230 has N variable frequencies, and the charge pump module 210 comprises N filters and N charge pump circuits, wherein N is an integer larger than or equal to 2.

In this embodiment, the filters 216, 217 and 218 are low pass filters. The filter 216 has the largest bandwidth, and all of the frequencies f1, f2 and f3 lie in the largest bandwidth. The filter 217 has the medium bandwidth, and both of the f2 and f3 lie in the medium bandwidth. The filter 218 has the smallest bandwidth, and only the frequency f3 lies in the smallest bandwidth.

The filter 216 receives the source clock CK and generates a first filtered clock CK1 to the charge pump circuit 211. The filter 217 receives the source clock CK and generates a second filtered clock CK2 to the charge pump circuit 212. The filter 218 receives the source clock CK and generates a third filtered clock CK3 to the charge pump circuit 213. Moreover, the output terminals of the charge pump circuits 211, 212 and 213 are connected with each other, and the output signal Vout is outputted from the output terminals of the charge pump circuits 211, 212 and 213.

Please refer to FIG. 4B. In the time interval between the time point t1 and the time point t4, the enabling signal EN is in the high level state, and the clock generator 230 is enabled to generate the source clock CK. The source clock CK has the frequency f1 in the time interval between the time point t1 and the time point t2, the source clock CK has the frequency f2 in the time interval between the time point t2 and the time point t3, and the source clock CK has the frequency f3 in the time interval between the time point t3 and the time point t4, wherein f1 is higher than f2, and f2 is higher than f3.

Consequently, in the time interval between the time point t1 and the time point t2, only the first filtered clock CK1 from the filter 216 is switched between the high level state and the low level state at the frequency f1, but the second filtered clock CK2 from the filter 217 and the third filtered clock CK3 from the filter 218 are maintained at the fixed level. In other words, only the charge pump circuit 211 generates the output voltage Vout in the time interval between the time point t1 and the time point t2. Under this circumstance, the charge pump module 210 has the weakest driving strength.

In the time interval between the time point t2 and the time point t3, the first filtered clock CK1 from the filter 216 and the second filtered clock CK2 from the filter 217 are switched between the high level state and the low level state at the frequency f2, but the third filtered clock CK3 from the filter 218 is maintained at the fixed level. In other words, the charge pump circuits 211 and 212 generate the output voltage Vout in the time interval between the time point t2 and the time point t3. Under this circumstance, the charge pump module 210 has the stronger driving strength.

In the time interval between the time point t3 and the time point t4, the first filtered clock CK1 from the filter 216, the second filtered clock CK2 from the filter 217 and the third filtered clock CK3 from the filter 218 are switched between the high level state and the low level state at the frequency f3. In other words, the charge pump circuits 211, 212 and 213 generate the output voltage Vout in the time interval between the time point t3 and the time point t4. Under this circumstance, the charge pump module 210 has the strongest driving strength.

Please refer to FIG. 4C. In the time intervals between the time points tm and tn, to and tp and tq and tr, the enabling signal EN is in the high level state. Consequently, the source clock CK is switched between the high level state and the low level state, and the magnitude of the output signal Vout gradually increases. Moreover, during the high-level period of the enabling signal EN, the three charge pump circuit 211, 212 and 213 are enabled at different time points because the filters 216, 217 and 218 have different bandwidths. Since the frequency of the source clock CK varies with time, the filters 216, 217 and 218 are operated according to the frequency of the source clock CK at the corresponding time point.

Figure 5A:
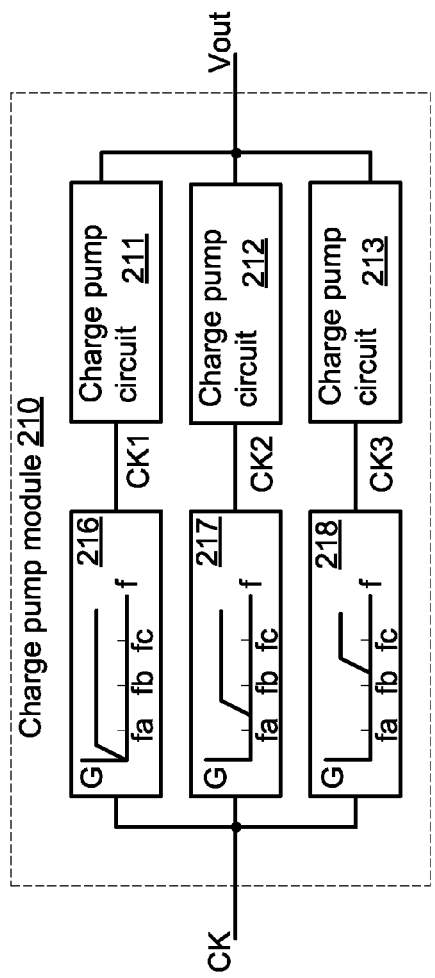
FIG. 5A is a schematic circuit diagram illustrating another exemplary charge pump module of the charge pump regulator according to the first embodiment of the present invention.
Figure 5B:
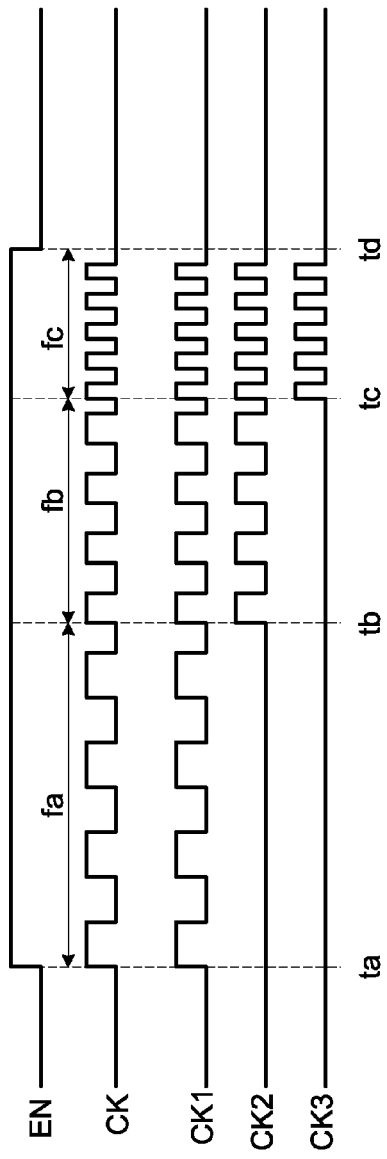
FIGS. 5B and 5C are schematic timing waveform diagrams illustrating associated signals of the charge pump module of FIG. 5A.
Figure 5C:
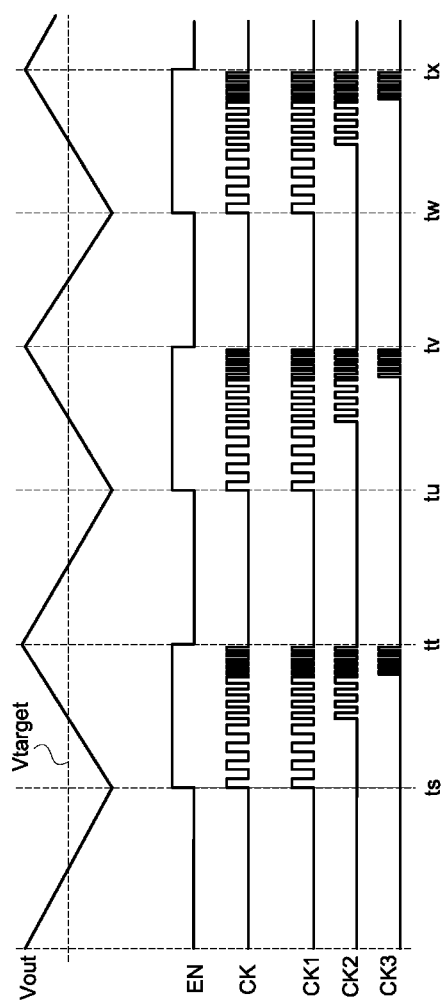

FIG. 5A is a schematic circuit diagram illustrating another exemplary charge pump module of the charge pump regulator according to the first embodiment of the present invention. FIGS. 5B and 5C are schematic timing waveform diagrams illustrating associated signals of the charge pump module of FIG. 5A. The charge pump module 210 comprises plural filters and plural charge pump circuits.

In this embodiment, the filters 216, 217 and 218 are high pass filters. The filter 216 has the largest bandwidth, and all of the frequencies fa, fb and fc lie in the largest bandwidth. The filter 217 has the medium bandwidth, and both of the fb and fc lie in the medium bandwidth. The filter 218 has the smallest bandwidth, and only the frequency fc lies in the smallest bandwidth.

The filter 216 receives the source clock CK and generates a first filtered clock CK1 to the charge pump circuit 211. The filter 217 receives the source clock CK and generates a second filtered clock CK2 to the charge pump circuit 212. The filter 218 receives the source clock CK and generates a third filtered clock CK3 to the charge pump circuit 213. Moreover, the output terminals of the charge pump circuits 211, 212 and 213 are connected with each other, and the output signal Vout is outputted from the output terminals of the charge pump circuits 211, 212 and 213.

Please refer to FIG. 5B. In the time interval between the time point ta and the time point td, the enabling signal EN is in the high level state, and the clock generator 230 is enabled to generate the source clock CK. The source clock CK has the frequency fa in the time interval between the time point ta and the time point tb, the source clock CK has the frequency fb in the time interval between the time point tb and the time point tc, and the source clock CK has the frequency fc in the time interval between the time point tc and the time point td, wherein fc is higher than fb, and fb is higher than fa.

Consequently, in the time interval between the time point ta and the time point tb, only the first filtered clock CK1 from the filter 216 is switched between the high level state and the low level state at the frequency fa, but the second filtered clock CK2 from the filter 217 and the third filtered clock CK3 from the filter 218 are maintained at the fixed level. In other words, only the charge pump circuit 211 generates the output voltage Vout in the time interval between the time point to and the time point tb. Under this circumstance, the charge pump module 210 has the weakest driving strength.

In the time interval between the time point tb and the time point tc, the first filtered clock CK1 from the filter 216 and the second filtered clock CK2 from the filter 217 are switched between the high level state and the low level state at the frequency fb, but the third filtered clock CK3 from the filter 218 is maintained at the fixed level. In other words, the charge pump circuits 211 and 212 generate the output voltage Vout in the time interval between the time point tb and the time point tc. Under this circumstance, the charge pump module 210 has the stronger driving strength.

In the time interval between the time point tc and the time point td, the first filtered clock CK1 from the filter 216, the second filtered clock CK2 from the filter 217 and the third filtered clock CK3 from the filter 218 are switched between the high level state and the low level state at the frequency fc. In other words, the charge pump circuits 211, 212 and 213 generate the output voltage Vout in the time interval between the time point tc and the time point td. Under this circumstance, the charge pump module 210 has the strongest driving strength.

Please refer to FIG. 5C. In the time intervals between the time points ts and tt, to and tv and tw and tx, the enabling signal EN is in the high level state. Consequently, the source clock CK is switched between the high level state and the low level state, and the magnitude of the output signal Vout gradually increases. Moreover, during the high-level period of the enabling signal EN, the three charge pump circuit 211, 212 and 213 are enabled at different time points because the filters 216, 217 and 218 have different bandwidths. Since the frequency of the source clock CK varies with time, the filters 216, 217 and 218 are operated according to the frequency of the source clock CK at the corresponding time point.

Figure 6:
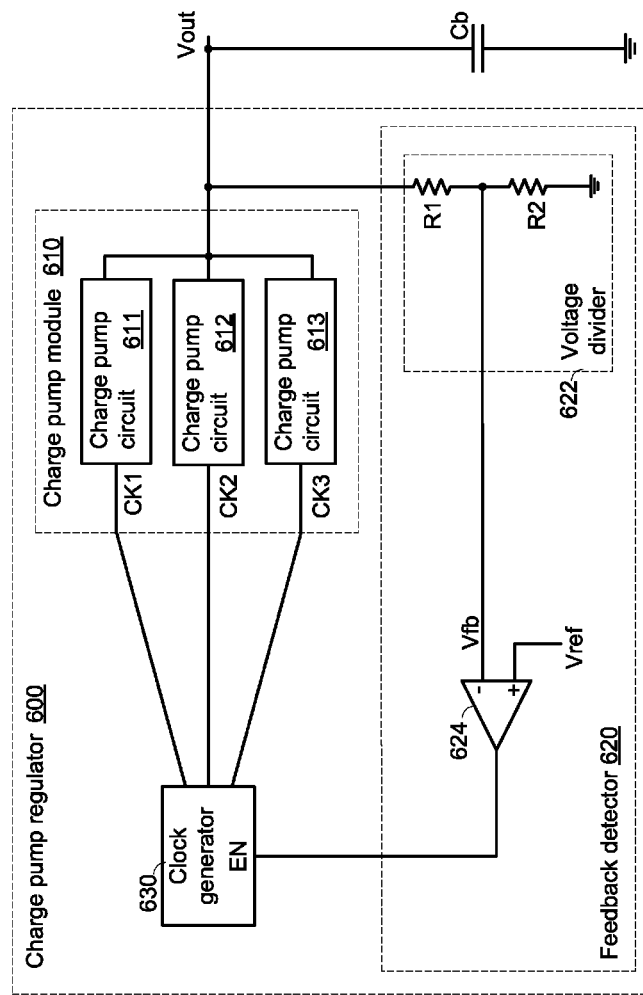
FIG. 6 is a schematic circuit block diagram illustrating a charge pump regulator according to a second embodiment of the present invention.

FIG. 6 is a schematic circuit block diagram illustrating a charge pump regulator according to a second embodiment of the present invention. As shown in FIG. 6, the charge pump regulator 600 comprises a charge pump module 610, a feedback detector 620 and a clock generator 630. An output signal Vout is generated by the charge pump regulator 600 and transmitted to a bulk capacitor Cb.

In this embodiment, the charge pump module 610 comprises three charge pump circuits 611, 612 and 613. After the charge pump circuits 611, 612 and 613 receive three source clocks CK1, CK2 and CK3, respectively, an output signal Vout is outputted from the charge pump module 610. Moreover, the feedback detector 620 comprises a voltage divider 622 and a comparator 624. The voltage divider 622 consists of two resistors R1 and R2. The operations of the voltage divider 622 are similar to those of the first embodiment, and are not redundantly described herein. It is noted that numerous modifications and alterations may be made while retaining the teachings of the invention. For example, the source clocks generated by the clock generator 630 have N variable frequencies, and the charge pump module 610 comprises N charge pump circuits, wherein N is an integer larger than or equal to 2.

When the clock generator 630 receives the enabling signal EN, three source clocks CK1, CK2 and CK3 are generated at different time points, and the frequencies of the three source clocks CK1, CK2 and CK3 are different. For example, in case that the enabling signal EN is in the low level state, the clock generator 630 is disabled. Consequently, the three source clocks CK1, CK2 and CK3 are maintained at the fixed levels, and the magnitude of the output signal Vout gradually decreases. Whereas, in case that the enabling signal EN is in the high level state, the clock generator 630 is enabled. Consequently, the clock generator 630 generates three source clocks CK1, CK2 and CK3 with different frequencies at different time points, and the magnitude of the output signal Vout gradually increases.

Figure 7A:
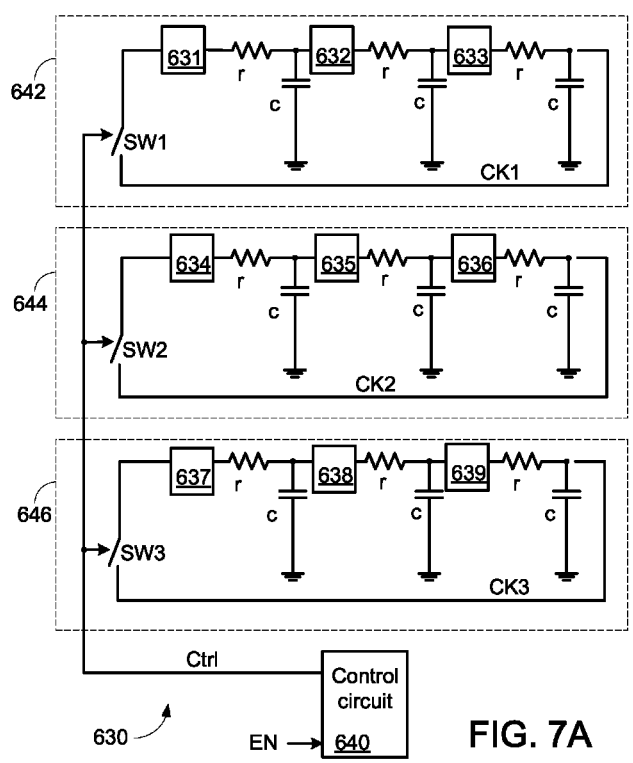
FIG. 7A is a schematic circuit diagram illustrating the clock generator of the charge pump regulator according to the second embodiment of the present invention.
Figure 7B:
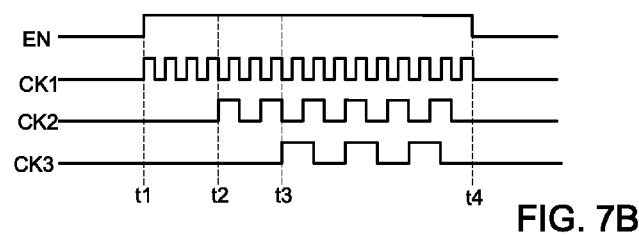
FIG. 7B is a schematic timing waveform diagram illustrating the source clocks of the clock generator of FIG. 7A.

FIG. 7A is a schematic circuit diagram illustrating the clock generator of the charge pump regulator according to the second embodiment of the present invention. FIG. 7B is a schematic timing waveform diagram illustrating the source clocks of the clock generator of FIG. 7A. In this embodiment, the clock generator 630 comprises three ring oscillators 642, 644, 646 and a control circuit 640. The configurations of each of the ring oscillators 642, 644 and 646 are similar to those of FIG. 3A, and are not redundantly described herein.

The inverter circuits 631, 632 and 633 of the ring oscillator 642 have the strongest driving strength. The inverter circuits 634, 635 and 636 of the ring oscillator 644 have the stronger driving strength. The inverter circuits 637, 638 and 639 of the ring oscillator 646 have the weakest driving strength. In other words, the first source clock CK1 has the highest frequency, the second source clock CK2 has the second highest frequency, and third source clock CK3 has the lowest frequency.

In a disabled period, the enabling signal EN received by the control circuit 640 is in the low level state. Meanwhile, the three switching elements SW1, SW2 and SW3 are in an open state according to a control signal Ctrl from the control circuit 640, and the three ring oscillators cannot be formed as loops.

In an enabled period, the enabling signal EN received by the control circuit 640 is in the high level state. Meanwhile, the three switching elements SW1, SW2 and SW3 are in a close state respectively according to the control signal Ctrl. Under this circumstance, the source clocks CK1, CK2 and CK3 are correspondingly generated.

Please refer to FIG. 7B. In the time interval between the time point t1 and the time point t4, the switching element SW1 is in the close state according to the control signal Ctrl. Consequently, the first source clock CK1 has the highest frequency in the time interval between the time point t1 and the time point t4. In the time interval between the time point t2 and the time point t4, the switching element SW2 is in the close state according to the control signal Ctrl. Consequently, the second source clock CK2 has the second highest frequency in the time interval between the time point t2 and the time point t4. In the time interval between the time point t3 and the time point t4, the switching element SW3 is in the close state according to the control signal Ctrl. Consequently, the third source clock CK3 has the lowest frequency in the time interval between the time point t3 and the time point t4.

The three charge pump circuits 611, 612 and 613 of the charge pump module 610 are operated according to the three source clocks CK1, CK2 and CK3, respectively, and the output signal Vout is outputted from the charge pump module 610. In particular, the charge pump circuit 611 start generating the output signal Vout at the time point t1 according to the first source clock CK1, the charge pump circuit 612 starts generating the output signal Vout at the time point t2 according to the second source clock CK2, and the charge pump circuit 613 starts generating the output signal Vout at the time point t3 according to the third source clock CK3. On the contrary, the source clocks CK1, CK2 and CK3 are maintained at the fixed levels at the time points, and the three charge pump circuits 611, 612 and 613 are disabled.

It is noted that the sequence of generating the source clocks CK1, CK2 and CK3 by the clock generator 630 is not restricted. For example, in some other embodiments, the third source clock CK3 having the lowest frequency is firstly activated, the second source clock CK2 having the second highest frequency is then activated, and first source clock CK1 having the highest frequency is finally activated. Moreover, the example of the clock generator 630 is not limited to the three ring oscillators. The clock generator with the similar function can be used as the clock generator 630 of the present invention. Moreover, by changing the resistance values of the resistors r or the capacitance values of the capacitors c, the frequencies of the source clocks CK1, CK2 and CK3 generated by the clock generator 630 are correspondingly adjusted.

Figure 8:
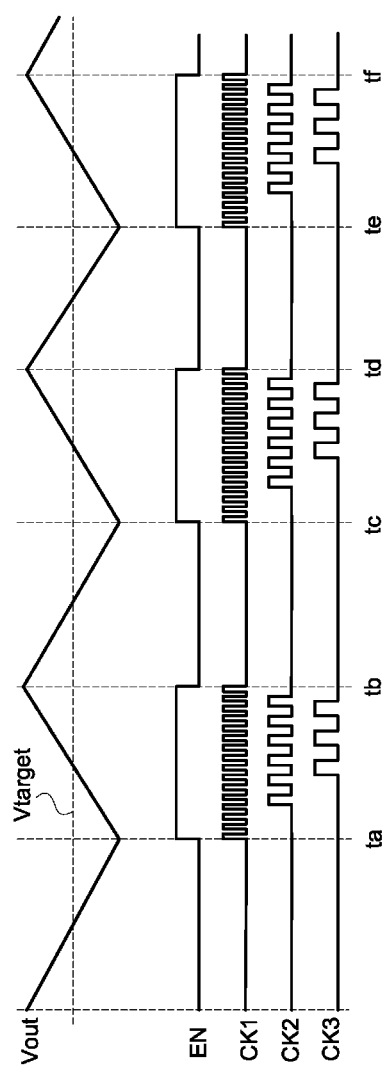
FIG. 8 is a schematic timing waveform diagram illustrating associated signals of the charge pump regulator according to the second embodiment of the present invention.

FIG. 8 is a schematic timing waveform diagram illustrating associated signals of the charge pump regulator according to the second embodiment of the present invention. In the time intervals between the time points ta and tb, tc and td and te and tf, the enabling signal EN is in the high level state. Consequently, the three source clocks CK1, CK2 and CK3 are switched between the high level state and the low level state at different time points, and the output signal Vout from the charge pump circuit 611, 612 and 613 gradually increases. In addition, the frequencies of the three source clocks CK1, CK2 and CK3 are different.

From the above descriptions, the present invention provides a charge pump regulator and a control method thereof. The charge pump regulator at least comprises a first charge pump circuit and a second charge pump circuit. In the enabled period, a first clock signal is provided to a first charge pump circuit, so the output voltage is outputted from the first charge pump circuit to an output terminal of the charge pump regulator. Moreover, in the enabled period, a second clock signal is provided to a second charge pump circuit, so the output voltage is outputted from the second charge pump circuit to the output terminal of the charge pump regulator.

Moreover, in a first time interval of the enabled period, the first clock signal has a first frequency, and the second clock signal is maintained at a fixed level. Moreover, in a second time interval of the enabled period, the first clock signal and the second clock signal have a second frequency, wherein the first frequency and the second frequency are different.

Alternatively, in a first time interval of the enabled period, the first clock signal has a first frequency, and the second clock signal is maintained at a fixed level. Moreover, in a second time interval of the enabled period, the first clock signal has the first frequency, and the second clock signal has a second frequency, wherein the first frequency and the second frequency are different.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A charge pump regulator, comprising:
a charge pump module having a clock input terminal receiving a source clock and an output terminal generating an output signal;
a feedback detector connected with the output terminal of the charge pump module, wherein the feedback detector receives the output signal and generates an enabling signal; and
a clock generator receiving the enabling signal and generating the source clock, wherein said clock generator further comprises a control circuit receiving the enabling signal, said control circuit stops the source clock at a fixed level when said enabling signal is at a first state, and said control circuit controls the source clock switched between a high level state and a low level state when said enabling signal is at a second state;

wherein the charge pump module comprises a first filter, a first charge pump circuit, a second filter and a second charge pump circuit, wherein the first filter receives the source clock from the clock input terminal and generates a first filtered clock, the first charge pump circuit receives the first filtered clock and generates the output signal to the output terminal of the charge pump module, the second filter receives the source clock from the clock input terminal and generates a second filtered clock, and the second charge pump circuit receives the second filtered clock and generates the output signal to the output terminal of the charge pump module; and wherein if the source clock from the clock generator is switched between the high level state and the low level state, the source clock has a first frequency in a first time interval and the source clock has a second frequency in a second time interval, wherein the first frequency and the second frequency are different.

2. The charge pump regulator as claimed in claim 1, wherein in the first time interval, the first filtered clock has the first frequency, and the second filtered clock is maintained at the fixed level, wherein in the second time interval, both of the first filtered clock and the second filtered clock have the second frequency.

3. The charge pump regulator as claimed in claim 2, wherein the first filter and the second filter are low pass filters, wherein the first frequency is higher than the second frequency, and a bandwidth of the first filter is larger than a bandwidth of the second filter.

4. The charge pump regulator as claimed in claim 2, wherein the first filter and the second filter are high pass filters, wherein the first frequency is lower than the second frequency, and a bandwidth of the first filter is larger than a bandwidth of the second filter.

5. The charge pump regulator as claimed in claim 1, wherein the feedback detector comprises:

a voltage divider receiving the output signal and generating a feedback signal; and a comparator, wherein a first input terminal of the comparator receives the feedback signal, a second input terminal of the comparator receives a reference voltage, and an output terminal of the comparator generates the enabling signal to the clock generator.

6. The charge pump regulator as claimed in claim 5, wherein the voltage divider comprises a first resistor and a second resistor, which are serially connected between the output terminal of the charge pump module and a ground terminal, wherein the output signal is equal to Vref×(1+R1/R2), wherein Vref is the reference voltage, R1 is a resistance value of the first resistor, and R2 is a resistance value of the second resistor.

7. The charge pump regulator as claimed in claim 1, wherein said first state is low, and said second state is high.

8. A charge pump regulator, comprising:

a charge pump module, wherein at least two clock input terminals of the charge pump module receive a first source clock and a second source clock, respectively, and an output terminal of the charge pump module generates an output signal, wherein the charge pump module at least comprises a first charge pump circuit and a second charge pump circuit, wherein the first charge pump circuit receives the first source clock and generates the output signal to the output terminal of the charge pump module, and the second pump circuit receives the second source clock and generates the output signal to the output terminal of the charge pump module;

a feedback detector connected with the output terminal of the charge pump module, wherein the feedback detector receives the output signal and generates an enabling signal; and a clock generator receiving the enabling signal and generating the first source clock and the second source clock in an enabled period, wherein said clock generator further comprises a control circuit receiving said enabling signal, when said enabling signal is at a first state, said control circuit is operating in said enabled period and controls said first source clock and said second source clock, when said enabling signal is at a second state, said control circuit stops said first clock and said second clock;

wherein in a first time interval of the enabled period, the first source clock from the clock generator has a first frequency and the second source clock from the clock generator is stopped at a fixed level; and wherein in a second time interval of the enabled period, the first source clock from the clock generator has the first frequency and the second source clock from the clock generator has a second frequency, wherein the first frequency and the second frequency are different.

9. The charge pump regulator as claimed in claim 8, wherein the clock generator at least comprises a first ring oscillator and a second ring oscillator, wherein the first ring oscillator generates the first source clock having the first frequency in the first time interval and the second time interval, wherein the second ring oscillator generates the second source clock having the second frequency in the second time interval.

10. The charge pump regulator as claimed in claim 8, wherein the feedback detector comprises:

a voltage divider receiving the output signal and generating a feedback signal; and a comparator, wherein a first input terminal of the comparator receives the feedback signal, a second input terminal of the comparator receives a reference voltage, and an output terminal of the comparator generates the enabling signal to the clock generator.

11. The charge pump regulator as claimed in claim 10, wherein the voltage divider comprises a first resistor and a second resistor, which are serially connected between the output terminal of the charge pump module and a ground terminal, wherein the output signal is equal to Vref×(1+R1/R2), wherein Vref is the reference voltage, R1 is a resistance value of the first resistor, and R2 is a resistance value of the second resistor.

12. The charge pump regulator as claimed in claim 8, wherein said first state is low, and said second state is high.

13. A control method for a charge pump regulator, the charge pump regulator at least comprising a first charge pump circuit, a second charge pump circuit, a first source clock, a second source clock, and a clock generator with a control circuit, the control method comprising steps of:

providing a first clock signal by said first source clock to the first charge pump circuit in an enabled period, so that the first charge pump circuit generates an output voltage to an output terminal of the charge pump regulator; and providing a second clock signal by said second source clock to the second charge pump circuit in the enabled period, so that the second charge pump circuit generates the output voltage to the output terminal of the charge pump regulator;

wherein said control circuit controls said first source clock and said second source clock during said enabled period;

wherein the first clock signal has a first frequency and the second clock signal is stopped at a fixed level in a first time interval of the enabled period, and both of the first clock signal and the second clock signal have a second frequency different from first frequency in a second time interval of the enabled period, or wherein the first clock signal has the first frequency and the second clock signal is stopped at the fixed level in the first time interval of the enabled period, and the first clock signal has the first frequency and the second clock signal has the second frequency in the second time interval of the enabled period.

14. The control method as claimed in claim 13, wherein in a disabled period, the first clock signal and the second clock signal are maintained at the fixed level.

15. The control method as claimed in claim 13, further comprising steps of:

receiving a source clock, wherein the source clock has the first frequency in the first time interval, and the source clock has the second frequency in the second time interval;

inputting the source clock into a first filter, so that the first filter generates the first clock signal; and inputting the source clock into a second filter, so that the second filter generates the second clock signal.

16. The control method as claimed in claim 13, further comprising steps of:

allowing a first ring oscillator to generate the first clock signal having the first frequency in the first time interval and the second time interval; and allowing a second ring oscillator to generate the second clock signal having the fixed level in the first time interval and generate the second clock signal having the second frequency in the second time interval.

* * * * *